United States Patent [19]

Patino

[11] Patent Number: 5,703,467
[45] Date of Patent: Dec. 30, 1997

[54] APPARATUS FOR EXPANDING BATTERY RECOGNITION IN A BATTERY CHARGING SYSTEM

[75] Inventor: Joseph Patino, Pembroke Pines, Fla.

[73] Assignee: Motorola, Inc., Schaumburg, Ill.

[21] Appl. No.: 726,567

[22] Filed: Oct. 4, 1996

[51] Int. Cl.$^6$ .................................................. H02J 7/10
[52] U.S. Cl. .................................... 320/106; 320/153
[58] Field of Search ............................ 320/13, 14, 15, 320/30, 35, 48

[56] References Cited

U.S. PATENT DOCUMENTS

| | | | |
|---|---|---|---|
| 5,166,623 | 11/1992 | Ganio | 324/427 |
| 5,184,059 | 2/1993 | Patino et al. | 320/15 |
| 5,371,453 | 12/1994 | Fernandez | 320/5 |
| 5,411,816 | 5/1995 | Patino | 429/7 |
| 5,471,128 | 11/1995 | Patino et al. | 320/13 |
| 5,576,610 | 11/1996 | Patino et al. | 320/31 |
| 5,606,241 | 2/1997 | Patino et al. | 320/48 |

Primary Examiner—Peter S. Wong
Assistant Examiner—Patrick B. Law
Attorney, Agent, or Firm—Barbara R. Doutre

[57] ABSTRACT

A battery charging system (300) provides an expanded range of battery recognition between a charger (302) and a battery (304). Two resistors (316, 318) are coupled in series across the positive and negative charging terminals (B+, B−) of the battery (304) such that when the battery is coupled to the charger (302) there is provided a voltage divider to an A/D port (332) which is used to determine the battery type. Initially, the charger (302) disables charge current to the battery (304) and the charger determines the first resistor (316) value by enabling a switching circuit (336) and reading A/D port (332). Current is then enabled through positive charge node (B+) with the switching circuit (336) switched off, and the value of second resistor (318) is determined. The two resistors (316, 318) provide for an expanded range within which the A/D port (332) can determine battery type. A second charging system (400) provides an expanded battery type recognition range in a three contact charging system.

2 Claims, 4 Drawing Sheets

APPARATUS FOR EXPANDING BATTERY RECOGNITION IN A BATTERY CHARGING SYSTEM

TECHNICAL FIELD

This invention relates to batteries and battery charging systems.

BACKGROUND

Referring to FIG. 1, there is shown a prior art block diagram for a battery charging system 100 consisting of a charger 102, radio battery 104 and radio 106. Radio 106 contains positive (B+) and negative (B−) battery terminals which are coupled to radio battery 104 via battery contacts 108 and 110, respectively. Battery 104 contains one or more battery cells 112, which dictate the voltage and current capacity of battery 104. It is very common for batteries which are used in portable radios to have a thermistor (Rt) 114, a battery capacity resistor (Rc) 116, and a short circuit protection diode (D1) 118. The thermistor 114 is typically monitored by the charger 102 to determine the temperature of the battery. The capacity resistor (Rc) 116 is typically monitored by the charger 102 to determine the capacity of the battery 104, prior to the battery being charged. The capacity resistor 116 also operates as a battery recognition identifier which identifies the battery type, number of cells, battery chemistry, and recommended charge rate. The battery charger 102 upon determining the battery parameters (e.g., 1000 milli-amp-hours) through capacity resistor (Rc) 116 will select the proper charging rate to use in order to optimally charge the battery.

Charger 102 consists of a charger monitor circuit 120, which can consist of a well known microprocessor or microcontroller as known in the art and appropriate control software. Charger monitor circuit 120 controls a charger control circuit 122 which provides charge current to battery 104. A control signal is transmitted by charger monitor circuit 120 to charger control circuit 122 via bus 124, the control signal informs the charger control circuit 122 as to how much current to source via line 126 to battery 104.

Charger monitor circuit 120 contains three analog to digital (A/D) ports 128, 130, and 132. A/D port 128 monitors the voltage on the B+ line. A/D port 130 senses the resistance of the capacity resistor Rc 116. A/D port 132 senses the resistance of thermistor Rt 114, as its resistance changes once the battery begins charging. A/D ports 130 and 132 includes external pull-up resistors which are used to determine the resistance of Rc 116 and Rt 114, by determining the voltage levels at A/D ports 130 and 132, respectively. Charging system 100 utilizes four interconnections between the charger 102 and the battery 104 through the B+, Rc, Rt, and B− (ground) connections labeled 134, 136, 138, and 140 respectively.

Referring now to FIG. 2, there is shown another prior art battery charging system 200 which utilizes three interconnections between its charger 202 and its battery 206. For a complete description of the operation of this circuit refer to U.S. Pat. No. 5,411,816 entitled METHOD AND APPARATUS FOR DETERMINING BATTERY CHARACTERISTICS which is herein incorporated by reference.

Both prior art charging schemes 100, 200 are limited as to the number of distinct Rc values which can be determined. This limitation is due in part to the component tolerances of the Rc resistor, the pull-up resistor, and the resolution of the A/D port which is typically an 8-bit A/D having a finite resolution of 255 steps. For example, in the charging system of FIG. 1, in a typical 5 volt system utilizing an external 5 percent, 10 kilo-ohm pull-up resistor on the A/D port 130, the number of distinct resistor values for the capacity resistor is limited to thirteen. In FIG. 2 of the of the prior art, to read the Rc element, transistor Q1 is turned on and then the circuit effectively becomes thermistor Rt in parallel with capacity resistor Rc and diode D2. Thus, the number of capacity resistors that can be determined through the A/D port of the charger monitor circuit becomes even more limited than that of the circuit of FIG. 1. As the number of different battery chemistries and capacities continue to expand and diversify, the need for an expanded battery recognition parameter increases.

Accordingly, there is a need for a battery charging system with expanded battery recognition. Such a system would allow chargers to operate on a wider scale of batteries having various chemistries, capacities, number of cells, and charge rates.

DETAILED DESCRIPTION OF THE PREFERRED EMBODIMENT

Figure 3:
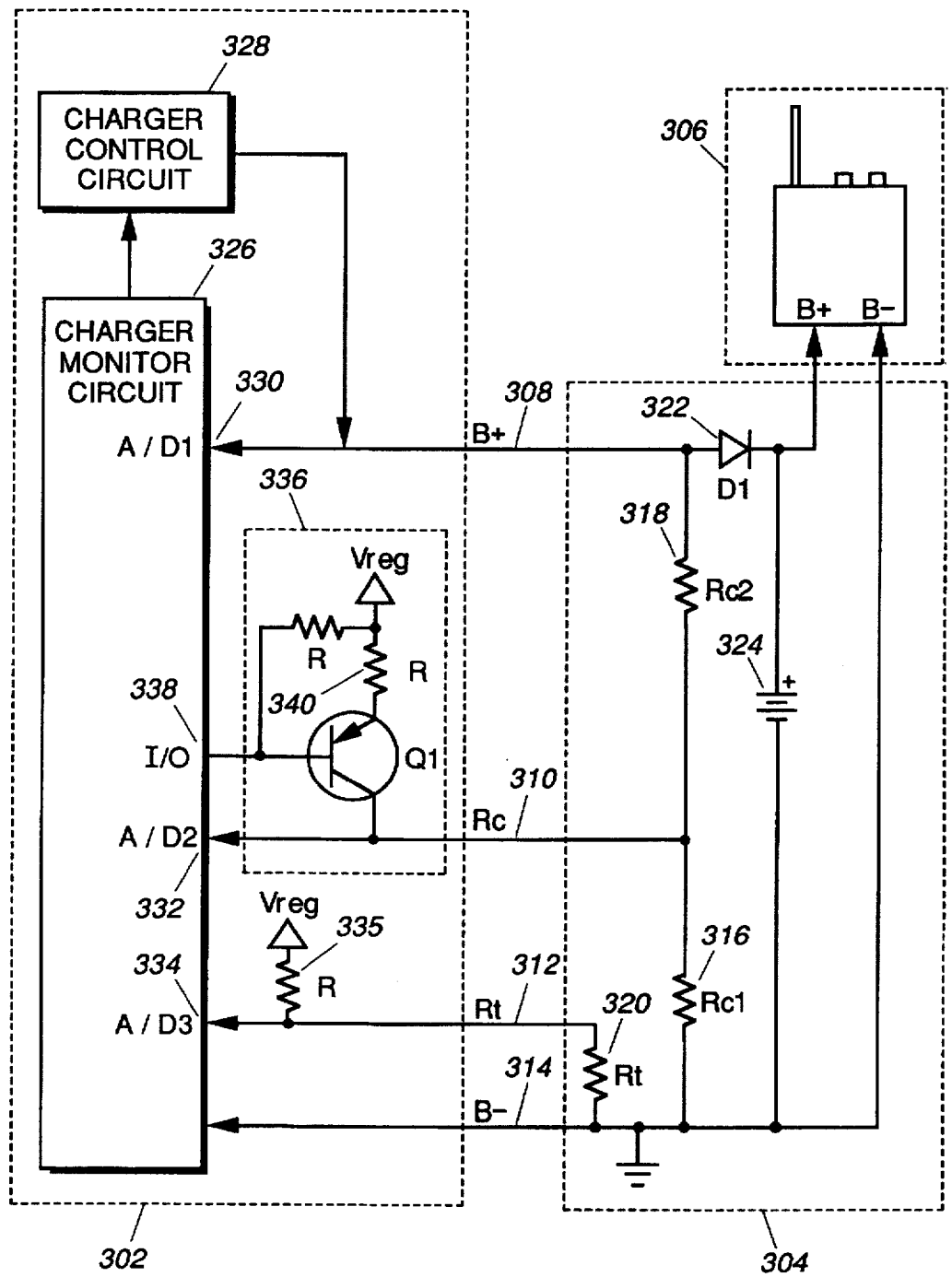
FIG. 3 is a schematic of a battery charging system in accordance with a first embodiment of the invention.

Referring FIG. 3, there is shown a battery charging system 300 in accordance with a first embodiment of the invention. This first embodiment represents a four contact charging system consisting of a charger 302, a battery 304, and a radio 306. Radio 306 may be coupled, as shown, to the battery 304 during the charging process or may be removed from the battery if desired. Interconnection between the charging terminals of charger 302 and the charging contacts of battery 304 is made through four nodes, B+, Rc, Rt, and B−, which are labeled by designators 308, 310, 312, and 314 respectively. In accordance with the first embodiment of the invention, battery 304 includes first and second capacity resistors (Rc1), (Rc2) labeled by designators 316, 318 respectively. In accordance with the first embodiment of the invention, the first and second capacity resistors (Rc1), (Rc2) are coupled in series across the B+ and B− nodes 308, 314 forming a voltage divider at the Rc node 310. Rc node 310 functions as a battery type indicator terminal for the charger 302. Further included in the battery 304 are thermistor resistor (Rt) 320 which indicates the temperature of the battery and short circuit protection diode (D1) 322 which protects against shorts across battery cells 324.

On the charger side of charging system 300, there is included a charger monitor circuit 326, such as a microprocessor known in the art, and charger control circuit 328 for charging the battery 304. Three A/D ports (A/D1, A/D2, and A/D3) labeled by designators 330, 332, 334 respectively interconnect with and monitor the B+, Rc, and Rt nodes respectively. A pull up resistor 335 is coupled to the Rt node 312 so that the temperature of the battery can be monitored through the voltage present at A/D 334. In accordance with the present invention, charger circuit 302 further includes switching circuitry 336 which operates in conjunction with the battery's capacity resistor voltage divider formed by (Rc1) (Rc2) to provide an expanded battery recognition range. The switching circuitry 336 comprises a transistor (Q1) biased through an I/O port 338 of the charger monitor circuit 326. Switching circuit 336 is supplied through a regulated supply voltage, Vreg, such as 5 volts. A pull up resistor 340 is coupled to transistor Q1 for the "on" mode.

Charging system 300 uses the capability of the charger's microprocessor to read an A/D voltage to calculate a corresponding resistance at the Rc node 310. By disabling the current flowing to the B+ node 308 and by switching pull up resistor 340 onto the Rc node 310, the value of resistor Rc1 can be determined from the voltage read at the A/D input 332 from the following resistor divider equation below:

$$V_{A/D_2} = \frac{R_{C1} \cdot (Vreg)}{R_{C1} + R_{pull\,up}}$$

solving for Rc1 yields, $$Rc1 = \frac{V_{A/D_2} \cdot R_{pull\,up}}{Vreg - V_{A/D_2}},$$

where $V_{A/D2}$ is the voltage A/D port 332, and Rpullup is resistor 340.

Once the value of Rc1 has been determined, the current to node B+ is then enabled, while transistor Q1 is switched off. Since the same current flows through capacity resistors Rc1 and Rc2, and since the voltages at A/D ports AD/1 330 and A/D2 332 are known and the value of Rc1 is also known, the charger can now determine the capacity resistor Rc2 value from the following equations:

$$\frac{VA/D2}{Rc1} = \frac{VA/D1 - VA/D2}{Rc2}$$

so, $$Rc2 = \frac{(VA/D1 - VA/D2) \cdot Rc1}{VA/D2}$$

For the purposes of this application the capacity resistor Rc values (Rc1), (Rc2) characterize a battery through elements which include, but are not limited to, chemistry, capacity, number of cells, and charge rate. All of these battery characteristics will collectively be referred to as battery type. The additional capacity resistor (Rc2) provides an expanded range within which the A/D port 332 and A/D port 330 can determine battery characteristics. Resistors values for Rc1 and Rc2 are selected in accordance with the charging systems power dissipation specifications. For example, in a system powered from a maximum B+ voltage of 12 volts, resistor values can be selected such that the series resistance of capacity resistors Rc1, Rc2 equates to approximately 1 kilo-ohm or greater to keep the total power dissipation in each capacity resistor (Rc1), (Rc2) below 150 milliwatt (mW). Thus, capacity resistors Rc1, Rc2 can be implemented using standard ⅛ Watt power rated resistors which are readily available and inexpensive.

In accordance with the first embodiment of the invention, the battery identification range of charging system 300 has been expanded by including two distinct capacity resistor variables. The addition of the Rc2 resistor in the voltage divider configuration provides a matrix of Rc values which can be determined, thus expanding the number of types of batteries which the system can recognize. In the prior art charging system 100, the Rc range was limited to 13 distinct values for a typical 5 volt A/D reference 5 percent tolerance part. By utilizing the charging system described in the first embodiment of the invention this range gets multiplied by the number of distinct values available for Rc2 (taking into account tolerances) such that a complete matrix or look-up table of Rc1 by Rc2 values are now available with which to characterize batteries. Of course, the selection of resistor values, tolerances, and power ratings can be modified in accordance with the specifications of the charging system.

In addition to the expanded battery type recognition, the charging system 300 described by the invention also provides backward compatibility. A battery formed in accordance with the first embodiment of the invention will have backward compatibility with prior art chargers, and chargers formed in accordance with the first embodiment of the invention will have backward compatibility with prior art batteries. The charging system 300 described by the invention thus provide a versatile approach to meet the needs of changing battery technologies.

Figure 4:
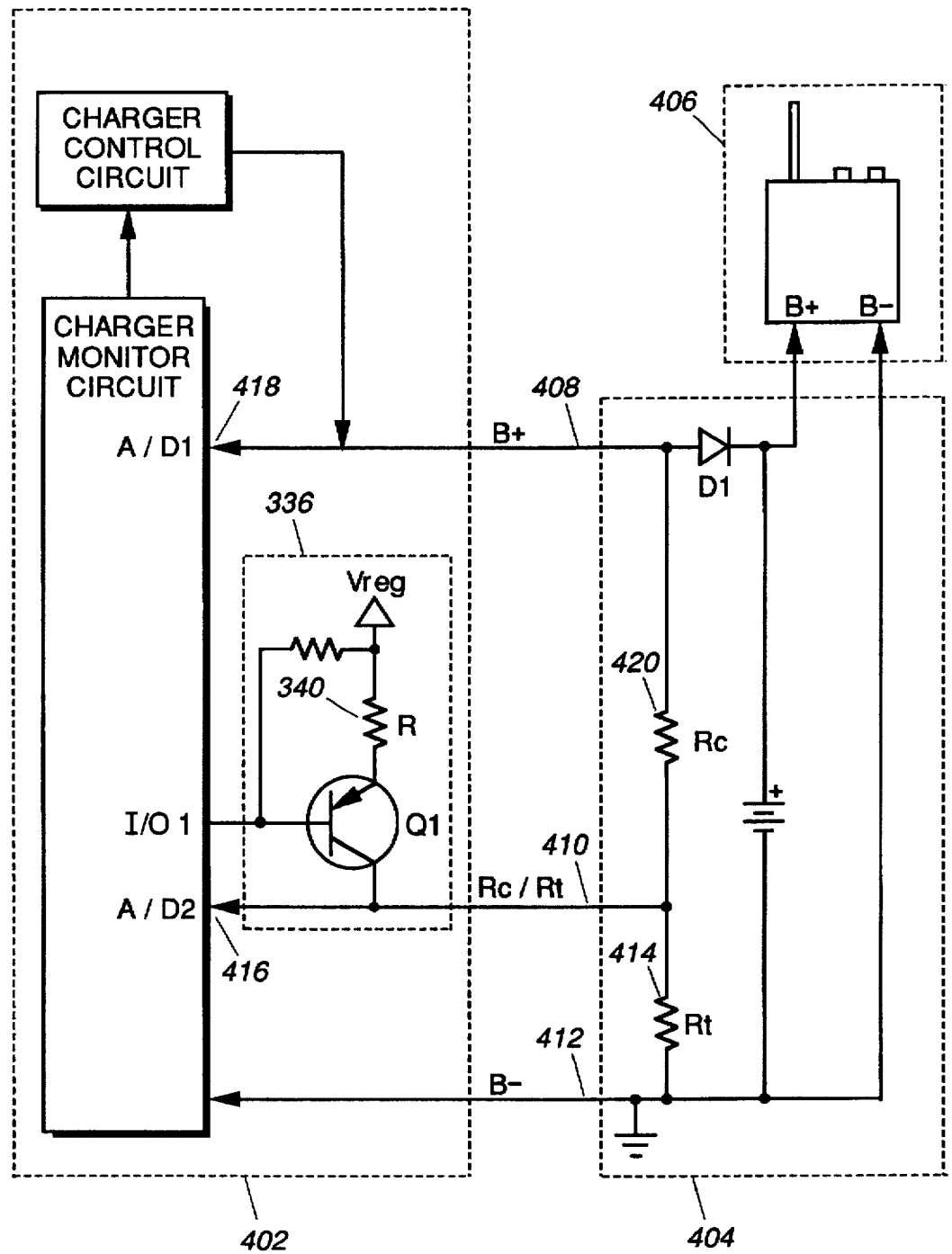
FIG. 4 is a schematic of a battery charging system in accordance with a second embodiment of the invention.

Referring now to FIG. 4, there is shown a second embodiment of an expanded battery recognition charging system 400 implemented in a three contact charging system. Charger system 400 includes charger 402, battery 404, and radio 406. Once again it is not necessary for radio 406 to be coupled to the battery 404 during the charging of the battery. Charger terminals of charger 402 interconnect with the charging contacts of battery 404 through nodes B+, Rc/Rt, and B− labeled by designators 408, 410, 412 respectively. A capacity resistor (Rc) 420 and a thermistor (Rt) 414 are coupled in series across the charging nodes B+ and B−, the capacity resistor 420 being coupled to the B+ node and the thermistor resistor 414 being coupled to the B− node. In this embodiment the thermistor (Rt) resistor 414 replaces the second capacity resistor used in the four contact charging system. Thus, Rc resistor 420 provides the battery recognition through the Rc/Rt node while eliminating one of the four contacts.

In accordance with the invention, charger 402 includes the additional switching circuitry 336 shown in FIG. 3 to allow for the determination of the Rc and Rt resistors 420, 414. By disabling the current flowing to the B+ node 408 and by switching pull up resistor 340 onto the Rc/Rt node 410, the value of thermistor resistor Rt 414 can be determined from the voltage read at the A/D input 416 from the following resistor divider equation below:

$$V_{A/D2} = \frac{Rt \, (Vreg)}{Rt + R_{pull\,up}}$$

solving for Rt yields, $$Rt = \frac{VA/D2 \cdot R_{pull\,up}}{Vreg - VA/D2},$$

where VA/D2 is the voltage A/D port 416 and Rpull up is resistor 340.

Once the thermistor (Rt) resistor 414 has been determined, the current to node B+ is then enabled, while transistor Q1 is switched off. Since the same current flows through capacity resistor Rc 420 and thermistor resistor Rt 414 and since the voltages at Aft) ports AD/1 418 and A/D2 416 are both known and Rt is also known, the charger now determines the Rc value from the following equations:

$$\frac{VA/D2}{Rt} = \frac{VA/D1 - VA/D2}{Rc}$$

-continued $$Rc = \frac{(VA/D1 - VA/D2) * Rt}{VA/D2}$$

Figure 2:
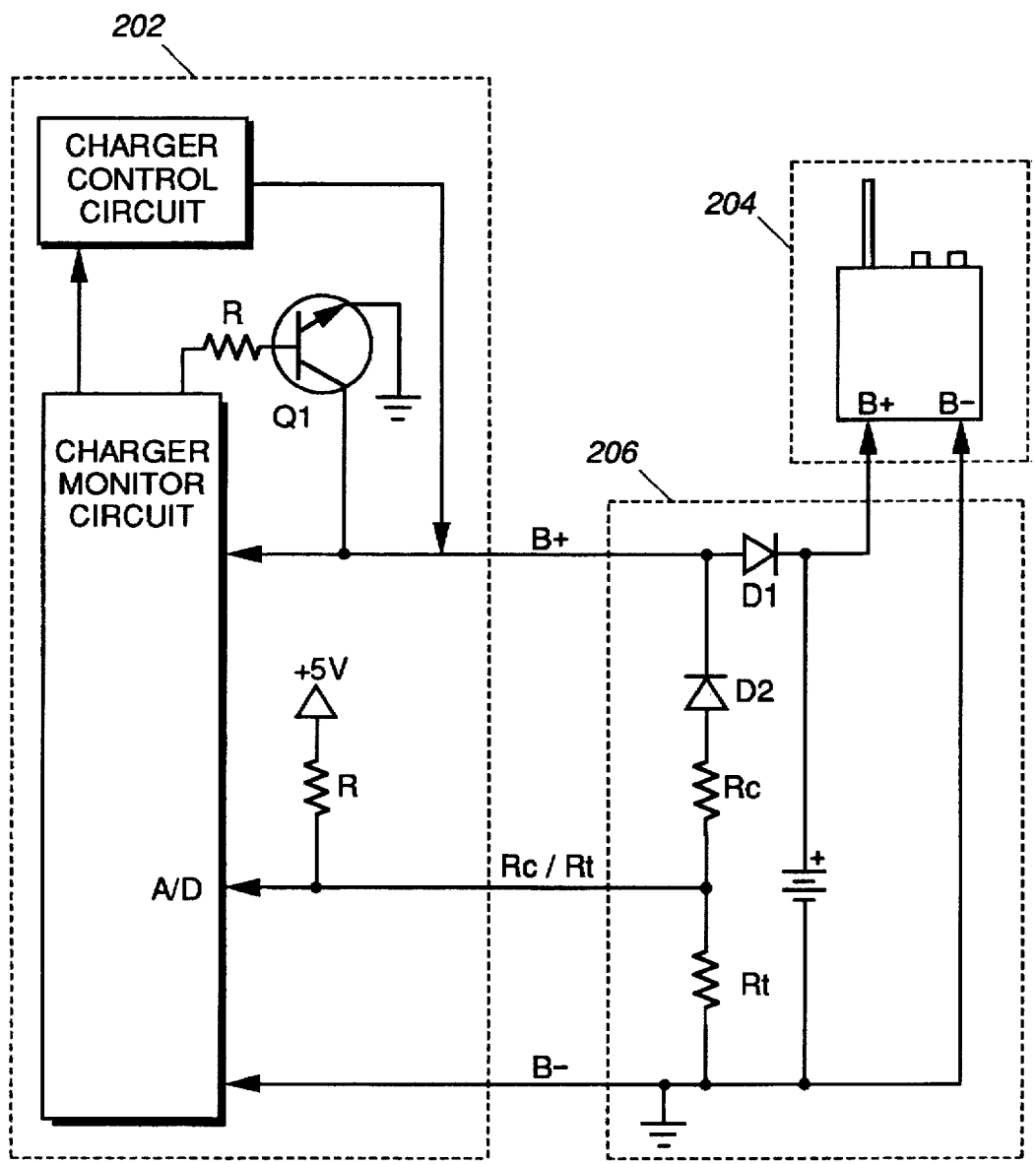
FIG. 2 is a schematic of a second prior art battery charging system.

Rc/Rt node 410 functions as a battery type indicator terminal for the charger 402. Hence, two distinct variables, Rc and Rt, have been used to determine battery type and battery temperature through the Rc/Rt node. In the prior art charging system of FIG. 2, the Rc element is switched in parallel, is referenced to 5 volts, and is determined by a single A/D port thus limiting the available number of Rc values to approximately 8 distinct values. The charging system 400 of the second embodiment, on the other hand, uses a series Rc element which is not switched in parallel, uses a B+ reference and two A/D ports (A/D1, A/D2). The Rc tolerance is thus not adversely affected and therefore all 13 possible distinct Rc values are determinable. Hence, an expansion of battery type recognition over the prior art three contact charging system 200 has been achieved.

Figure 1:
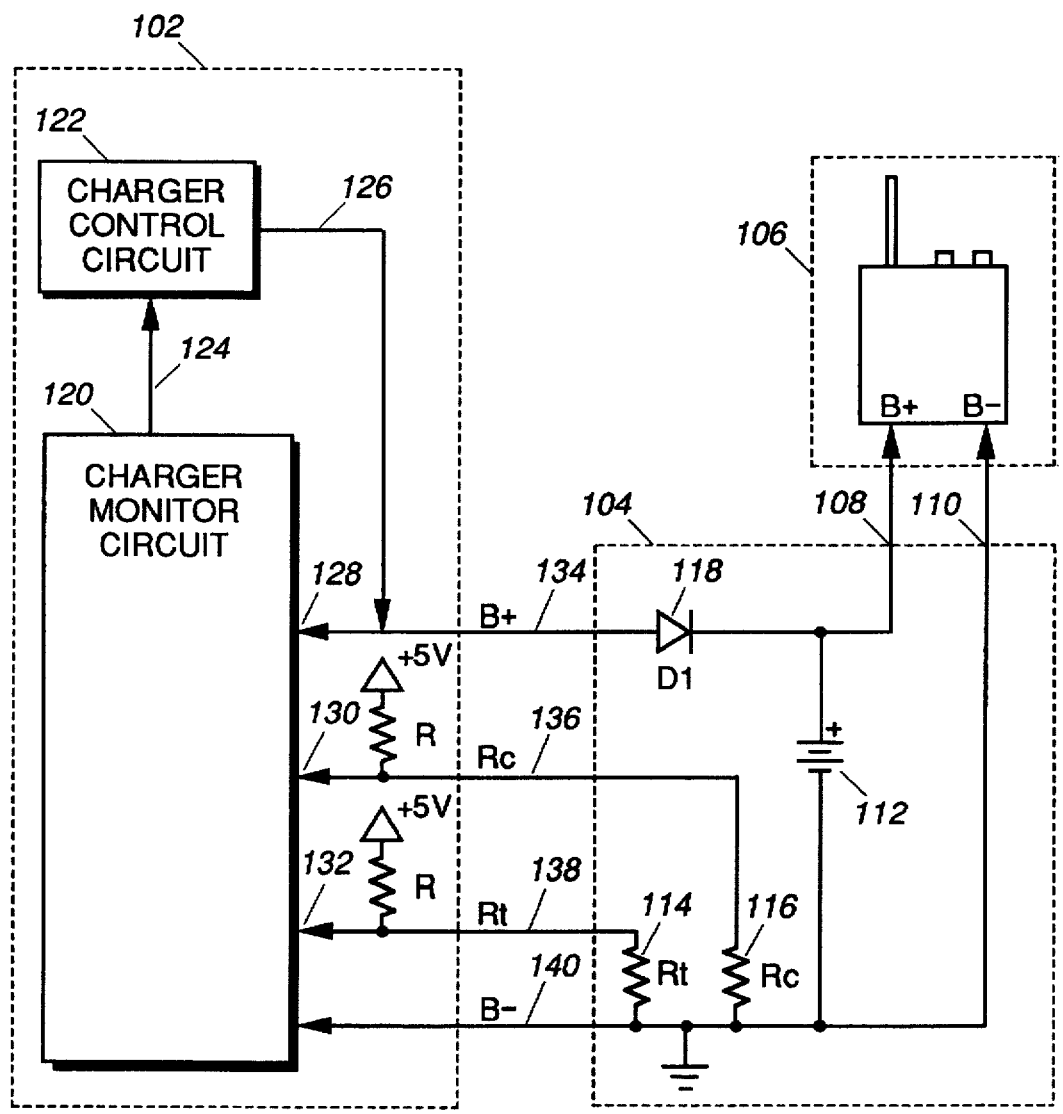
FIG. 1 is a schematic of a first prior art battery charging system.

Both charging systems 300, 400 use two resistors coupled in series across the positive (B+) and negative (B−) nodes to provide a voltage divider to an A/D port, which under controlled operating conditions, provides an expanded array of battery recognition values which can be determined. System 300 provides an expanded battery type recognition over the prior art system 100 of FIG. 1, and system 400 provides an expanded battery type recognition over the prior art system 200 of FIG. 2.

Using two resistors in the manner described by the first and second embodiments of the invention allows for an expanded look up table to be stored within the charger control circuit which in turn allows for a larger number of battery types to be characterized. By expanding the array of the look-up table, the charger systems 300, 400 described by the invention can accommodate an increase in the variety of battery types which can be charged in a single charger. This is accomplished without additional contacts to the charger or the battery and without impact to the temperature sensing capability of the charging circuitry.

What is claimed is:

1. A battery charging system, comprising:

a charger circuit, including:
   a positive charging terminal;
   a negative charging terminal;
   a control circuit for controlling a charge current;
   a monitor circuit having an analog to digital converter (A/D) port; and
   a switching circuit for switching a pull up resistor on to and off of the A/D port;

a battery having a predetermined battery type, including:
   a positive charging contact for coupling to the positive charging terminal of the charger;
   a negative charging contact for coupling to the negative charging terminal of the charger;
   a first resistor coupled to the positive charging contact;
   a second resistor coupled to the negative charging contact, said first and second resistors coupled in series and providing a voltage divider for coupling to the A/D port of the charger; and the A/D port determining the value of the second resistor when the charge current from the control circuit is disabled and the switching circuit switches the pull up resistor on to the A/D port, and the A/D port determining the value of the first resistor when the charge current from the control circuit is enabled and the switching circuit switches the pull up resistor off of the A/D port, the first and second resistor values providing a range within which the A/D port determines the predetermined battery type.

2. A battery charging system as described in claim 1, wherein the second resistor comprises a thermistor.

* * * * *